Patented Sept. 11, 1951

2,567,847

UNITED STATES PATENT OFFICE 2,567,847

PREPARATION OF SUBSTITUTED MELAMINES

Donald W. Kaiser, Riverside, Conn., assignor to American Cyanamid Company, New York, N. Y., a corporation of Maine No Drawing. Application September 20, 1946, Serial No. 698,397

6 Claims. (Cl. 260—249.5)

The present invention relates to an improved method for the preparation of susbtituted melamines.

An object of the present invention is to prepare substituted melamines of the following structural formula

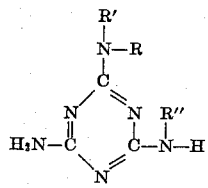

where R is selected from the group consisting of hydrogen, aliphatic, alicyclic, aromatic, aralkyl, and heterocyclic radicals, and R' and R'' are selected from the group consisting of aliphatic, alicyclic, aromatic, aralkyl, and heterocyclic radicals, and may be the same or different.

Another object of the present invention is to prepare such substituted melamines using less expensive and more easily employed reactants, and simple apparatus and procedures while providing high yields.

Other objects of the present invention will be made apparent from the discussion hereinafter.

In the past, the preparation of substituted melamines has been effected by the reaction of cyanuric chloride or dicyandiamide with an amine. Both of these methods leave much to be desired. For example, the use of cyanuric chloride is highly disadvantageous because of its disagreeable and corrosive nature, and in addition it is an expensive chemical because of the laborious methods by which it must be prepared. On the other hand, the reaction of dicyandiamide with an amine does not provide any particular N-substituted melamine but rather yields a conglomerate mixture of mono-, di-, and trisubstituted melamines which can only be separated with great difficulty.

It has now been discovered that substituted melamines of the above-given formula may be prepared by reacting mono- and disubstituted cyanamides with dicyandiamide and 1-monosubstituted dicyandiamides. Preferably, the reaction of the present invention is carried out in a solvent and/or diluent in the presence of suitable base at a suitably elevated temperature.

While a large variety of solvents and/or diluents such as the ethers, ketones, esters, alcohols, aromatic and aliphatic hydrocarbons, and the like, may be employed, water-miscible, hydroxylated solvents such as water, methanol, ethanol, propanol, isopropanol, butanol, isobutanol, ethylene glycol, diethylene glycol, triethylene glycol, tetraethylene glycol, propylene glycol, the monomethyl, -ethyl, and -butyl ethers of ethylene glycol, the monomethyl, -ethyl, and -butyl ethers of diethylene glycol, and the like are preferred. In general, such water-miscible, hydroxylated solvents have a greater solubilizing effect on the cyanamide and dicyandiamide reactants and likewise on the alkali metal bases which are preferably employed in catalyzing the reaction. Further advantages attendant upon the use of such water-miscible solvents is that such use permits carrying out the invention within the prefered temperature range of 70°–170° C. without the necessity of employing a closed reaction vessel such as an autoclave, and that the substituted melamines produced in the reaction are generally insoluble in such solvents and thus may be easily isolated by simple procedures of crystallization. Where possible, of course, water is employed as the solvent or diluent because of cost considerations and it may generally be so employed when the substituents in the cyanamide or dicyandiamide molecule are of low molecular weight. Such cases, however, are limited in number so that it is generally preferable to employ a water-miscible, hydroxylated organic solvent and in this connection it is still more preferable to employ one of the aforementioned ethylene glycol and diethylene glycol mono ethers which are commercially available as the "Cellosolves" and "Carbitols," respectively.

The strongly basic materials which may be used to catalyze the reaction of the present invention consist of the alkali metal oxides, hydroxides, and alkoxides, such less basic alkali metal compounds as the bicarbonates and carbonates being substantially ineffective in catalyzing the reaction. The selection of the particular catalyst to be employed in a given instance depends largely upon the solvent employed, which, as aforementioned, is dependent upon the solubility characteristics of the particular reactants. As is known to those skilled in the art, the alkali metal alkoxides or the alkali metals themselves are more soluble in hydroxylated organic solvents than are the alkali metal hydroxides. Also, potassium hydroxide has a greater solubility in such solvents than does sodium hydroxide, and this together with its greater basicity makes its use preferred. Rubidium and caesium hydroxides being likewise more basic than sodium hydroxide are likewise preferred, but in view of their relative unavailability and/or high cost this is of little practical significance. While the amount of such basic catalyst which may be employed may be widely varied, it is generally advisable to employ about $\frac{1}{10}$ mol of base per mol of the cyanamide or dicyandiamide reactant whichever is employed in smaller amount. The use of amounts appreciably smaller than this ratio requires longer periods for reaction and results in lower yields, whereas the use of amounts in excess of the ratio affords no additional advantage.

While the reaction of the present invention may be carried out over a wide range of temperatures it is generally preferable that it be conducted at a temperature within the range of substantially 70°–170° C. At temperatures substantially below this range the rate of reaction is quite low whereas at temperatures substantially in excess of this range there is a strong tendency for side-reactions resulting in the production of by-products such as melamine, ammeline, ammelide, and the like. It is still more preferable to employ a temperature within the range of about 100°–150° C. using a solvent having a boiling point above 100° C. at atmospheric pressure so that the use of a closed vessel such as an autoclave may be avoided.

No particular difficulty is encountered in determining the time required for the reaction to take place since the reaction occurs quite rapidly and its progress may be readily determined by the amount of product which has precipitated in the reaction mixture. In general, the reaction is completed in from 10 minutes to an hour, although additional periods are sometimes advantageous.

The substituted melamines of the present invention are valuable chemicals being useful as intermediates in the preparation of chemotherapeutic agents, pharmaceuticals, textile agents, insecticides, rubber chemicals, plastics, resins and the like.

The disubstituted cyanamides employed in the reaction of the present invention may be prepared by reacting an alkali metal cyanamide such as disodium or dipotassium cyanamide with 2 mols of an alkyl or aryl halide, while both the mono- and disubstituted cyanamides may be prepared by treating a primary or secondary amine, respectively, with cyanogen chloride, preferably in the presence of alkali metal hydroxide. The 1-monosubstituted dicyandiamides employed in the reaction are prepared by reacting a primary amine or an acid addition salt thereof with a dicyanimide, preferably sodium dicyanimide, at a temperature within the range of 50°–125° C. and preferably in an alcoholic solvent.

EXAMPLE 1

*N-dimethylmelamine*

6.6 g. (0.10 mol) of 85% KOH were added to 250 cc. of butanol with stirring. After the alkali had dissolved, 101 g. (1.2 mols) of powdered dicyandiamide and 70 g. (1.0 mol) of dimethylcyanamide were added and the slurry heated to 90° C. with stirring. Thereafter, the temperature continued to rise despite removal of the heat source, so that the flask was surrounded by an ice bath to decrease the vigor of the reaction. After removal of the ice bath the temperature remained at 116° C. for about 5 minutes and then fell. After cooling, the solid N-dimethylmelamine was filtered, washed with water and air-dried. The N-dimethylmelamine weighed 125 g. (81.5% yield) and melted with decomposition at 295°–298° C. Recrystallization from 50% "Cellosolve" (ethylene glycol monoethyl ether) required 5 l. to effect solution of the difficultly soluble N-dimethylmelamine. Colorless needles were obtained which decomposed at 307°–308° C.

When the above experiment was repeated using 125 cc. of water instead of the above 250 cc. of butanol, complete solution of the dicyandiamide occurred, the temperature rose from 75° to 105° C., cooling being required to prevent a further rise in temperature, and the yield was 67.5% of N-dimethylmelamine. In another run, using a higher ratio of alkali hydoxide, and likewise carrying out the reaction in water the yield of N-dimethylmelamine was 74% of the theoretical.

EXAMPLE 2

*N-diethylmelamine*

After dissolving 6.6 g. (0.10 mol) of 85% KOH in 100 cc. of "Cellosolve," 98 g. (1.0 mol) of diethylcyanamide and 101 g. (1.2 mols) of powdered dicyandiamide were added and the mixture heated with stirring. At 100° C. a thin slurry formed and at 115° C. amost complete solution resulted. The heat source was removed and the temperature continued to rise to 135° C. At this temperature a clear solution was formed and it was necessary to employ an ice bath for about 5 minutes to prevent a higher temperature rise. The temperature of the solution began to drop and solid N-diethylmelamine separated. The reaction mixture was poured over ice, the solid was removed by filtration, washed with water, and dried in an oven at 80° C. The N-diethylmelamine melted at 175°–178° C. and the yield of crude product was 136 g. or 74.5% of theory. Crystallization from about 4 l. of 50% "Cellosolve" and treating the solution with charcoal, gave dense, colorless crystals which melted at 177°–178° C.

In a previous experiment the use of a small piece of sodium in place of the above-mentioned KOH provided a similarly high yield of N-diethylmelamine.

EXAMPLE 3

*N-diallylmelamine*

A solution of 4.0 g. (0.06 mol) of 85% KOH in 200 cc. of "Cellosolve" was prepared and 122 g. (1.0 mol) of diallylcyanamide and 101 g. (1.2 mols) of dicyandiamide were added and the slurry heated to 75° C. with stirring. The flame was removed and in a period of about 10 minutes the temperature climbed to 118° C. and then fell. The resulting thin slurry was thereafter heated to reflux at 144° C. to provide complete solution. After heating for several minutes, the solution was allowed to cool and was then poured over ice. The colorless, solid product separated, was filtered, washed with water, and air-dried. The N-diallylmelamine melted at 143°–145° C. and weighed 157 g., which represented 75% of the theoretical yield. Crystallization from about 2 l. of 10% ethyl alcohol and decolorizing with charcoal gave 124 g. of colorless needles which melt at 144°–145° C. Further recrystallization from dilute ethanol did not change the melting point.

EAMPLE 4

*N-dibenzylmelamine*

A stirred mixture of 10.0 g. (0.24 mol) of powdered 97% NaOH, 250 cc. of "Cellosolve," 168 g. (2.0 mols) of dicyandiamide, and 300 g. (1.35 mols) of dibenzylcyanamide was heated to 140° C. and the heat source removed. A very mild exothermic reaction occurred and the temperature slowly rose to 144° C. and thereafter began to fall. During this time the thin slurry became thick with crystalline solid. Upon cooling to room temperature, the solid was filtered off, washed with a small amount of "Cellosolve" and thereafter with water and then dried in an oven at 110° C. The resulting nearly colorless crystals of N-dibenzylmelamine melted at 220°–222° C. and weighed 302 g. or 73% of theory. Recrystallization from 1500 cc. of "Cellosolve" and decolorizing with charcoal gave dense, colorless crystals which melted at 222°–223° C. and weighed 274 g. or 67% of theory.

EXAMPLE 5

*β-Oxytetramethylenemelamine*

(A) After mixing 600 cc. of butanol, 6.0 g. (0.14 mol) of 97% NaOH, 183 g. (2.2 mols) of powdered dicyandiamide and 160 g. (1.3 mols) of N-cyanomorpholine, the stirred mixture was heated to 70° C. Thereafter, the temperature rose to 78° C. and after about 20 minutes began to fall. The slurry was then heated to about 144° C., cooled, and after cooling to room temperature the light thin solid which separated was removed by filtration, washed with butanol and acetone, and air-dried. The N-oxytetramethylenemelamine melted with decomposition at 235° C. and weighed 263 g. or 93.4% of theory. For purification, the solid was dissolved in a large volume of hot water, treated with decolorizing charcoal, the solution filtered, and allowed to cool. Fine, colorless needles were obtained which melted with decomposition at 251°–252° C.

(B) After dissolving 1.5 g. (0.022 mol) of 85% KOH in 50 cc. of water, 50.4 g. (0.60 mol) of dicyandiamide and 56.0 g. (0.5 mol) of N-cyanomorpholine were added with stirring and the mixture was heated in an oil bath to an internal temperature of 80° C. Complete solution occurred and the oil bath was removed. The temperature continued to rise, reaching a maximum of 115° C. The colorless solid β-oxytetramethylenemelamine separated at this point. After the temperature had started to fall the stirred mixture was refluxed at about 110° C. for an additional 15 minutes using the aforementioned oil bath. The reaction mixture was then cooled, neutralized with acetic acid and the colorless β-oxytetramethylenemelamine was filtered, washed with water and air-dried to provide a yield of 76.5% of theory. The melting point of this material was 245°–247° C.

(C) After dissolving 2.0 g. (0.0480 mol) of 97% NaOH in 125 cc. of methanol, 50.4 g. (0.60 mol) of dicyandiamide and 56.0 g. (0.5 mol) of N-cyanomorpholine were added with stirring and the mixture heated to 50° C. whereupon the heat source was removed. The temperature climbed to 73° C. and then began to fall. The slurry was thereafter stirred and refluxed for an additional ½ hour, the solid β-oxytetramethylenemelamine which had separated was filtered and washed with methanol and after air-drying amounted to 39.2% of theory.

EXAMPLE 6

*N-β-oxytetramethylene-N'-phenylmelamine*

3.3 g. (0.05 mol) of 85% KOH were dissolved in 150 cc. of methyl "Cellosolve" (ethylene glycol monomethyl ether) and thereafter 56 g. (0.50 mol) of N-cyanomorpholine and 88 g. (0.55 mol) of 1-phenyldicyandiamide were added and the stirred mixture heated. At 105° C. a clear solution was obtained and the flame was removed. In about 5 minutes the temperature had risen to 125° C. and thereafter began to fall. The solution was then heated to reflux for a short period, the flame was removed, and after cooling to 100° C. the reaction mixture was poured into water to precipitate nearly colorless, granular solid N-β-oxytetramethylene-N'-phenylmelamine. After air-drying, the N-β-oxytetramethylene-N'-phenylmelamine weighed 114 g. or 84% of theory and melted at 185°–187° C. Two recrystallizations from a large volume of dilute "Cellosolve" and decolorizing with charcoal, gave colorless, minute crystals which melted at 224°–225° C.

EXAMPLE 7

*N-dimethyl-N'-dodecylmelamine*

3.0 g. (0.04 mol) of 85% KOH, 100 cc. of butyl "Cellosolve" (ethylene glycol monobutyl ether), 106 g. (0.40 mol) of 96% 1-dodecyldicyandiamide and 35 g. (0.50 mol) of dimethylcyanamide were mixed with stirring. A slightly turbid solution was obtained at 70° C. and after heating to 100° C. the flame was removed. The temperature continued to rise to a maximum of 130° C. and then fell. When the temperature had dropped to 120° C. the solution was poured over ice to precipitate a nearly colorless solid. After drying, the crude N-dimethyl-N'-dodecylmelamine weighed 114 g. Crystallization from hexane followed by further recrystallization from hexane-ethanol resulted in the recovery of 36 g. of 1-dodecyl dicyandiamide as a first crystal crop yield. Upon evaporation of the ethanol-hexane solution an additional 38 g. of N-dimethyl-N'-dodecylmelamine melting at 88°–90° C. were obtained. Recrystallization of the first crystal crop from hot acetone gave 17.0 g. of dense, colorless crystals which melted at 95°–96° C. Further recrystallizations from acetone failed to raise the melting point of this material.

EXAMPLE 8

*N-methyl-N-phenylmelamine*

3.3 g. (0.05 mol) of 85% KOH were dissolved in 150 cc. of "Cellosolve" and 58.8 g. (0.7 mol) of dicyandiamide and 76.6 g. (0.58 mol) of methylphenylcyanamide were added. The mixture was heated at reflux for 1 hour and, after cooling, the reaction mixture was poured over ice, the solid which separated was filtered, and the crystalline product air-dried. A yield of 97 g. or 78% of theory of crystalline N-methyl-N-phenylmelamine melting at 246°–249° C. was obtained. Crystallization from "Cellosolve" raised the melting point to 248°–250° C.

EXAMPLE 9

*N-isopropylmelamine*

57.0 g. (0.68 mol) of isopropylcyanamide and 84.0 g. (1.0 mol) of dicyandiamide were added to a solution of 4 g. of 85% KOH contained in 250 cc. of "Cellosolve." The reaction mixture was heated at reflux for 15 minutes and thereafter poured over ice and neutralized with acetic acid. A small amount of amorphous solid was filtered off and after standing for a day in a refrigerator, 45 g. of crystalline N-isopropylmelamine, melting at 216°–218° C., were obtained.

In addition to the substituted cyanamides shown in the above examples, other substituted cyanamides which may be employed are methyl-, ethyl-, propyl-, allyl-, diisopropyl-, butyl-, dibutyl-, hexyl-, dihexyl-, γ-methoxypropyl-, di(2- ethylhexyl)-, 2-ethylhexyl-, 2,2-diethylhexyl-, octyl-, dioctyl-, dodecyl-, didodecyl-, octadecyl-, dioctadecyl-, β-chlorallyl-, di(β-chlorallyl)-, octadecenyl-, dioctadecenyl-, cyclohexyl-, dicyclohexyl-, cyclopentyl-, dicyclopentyl-, benzyl-, β-phenylethyl-, naphthylmethyl-, dinaphthylmethyl-, phenyl-, diphenyl-, p-chlorophenyl-, α-naphthyl-, β-naphthyl-, o-aminophenyl-, di(o-aminophenyl)-, sulfophenyl, disulfophenyl-, pyridyl-, dipyridyl-, piperidyl-, dipiperidyl-, furfuryl-, thenylcyanamide and the like.

Further, in addition to the 1-mono-substituted dicyandiamides employed in the above examples other such substituted dicyandiamides which may be employed are 1-methyl-, 1-ethyl-, 1-propyl-, 1-allyl-, 1-isopropyl-, 1-butyl-, 1-hexyl-, 1-(γ-methoxypropyl)-, 1-(2-ethylhexyl)-, 1-(2,2-diethylhexyl-, 1-(β-sulfoethyl)-, 1-octyl-, 1-octadecyl-, 1-(β-chlorallyl)-, 1-octadecenyl-, 1-cyclohexyl-, 1-cyclopentyl-, 1-benzyl-, 1-(β-phenylethyl)-, 1-naphthylmethyl-, 1-(α-naphthyl)-, 1-(β-naphthyl)-, 1-(o-aminophenyl)-, 1-p-sulfophenyl-, 1-(o-hydroxyphenyl)-, 1-(m-hydroxyphenyl)-, 1-pyridyl-, 1-piperidyl-, 1-furfuryl-, 1-thenyldicyandiamide, and the like.

While the invention has been described with particular reference to specific embodiments, it is to be understood that it is not to be limited thereto but is to be construed broadly and restricted solely by the scope of the appended claims.

As used in the claims, the term "heterocyclic" is defined as a ring containing at least one carbon atom.

What is claimed is:

1. The process which comprises heating substantially equimolar amounts of a member of the group consisting of dicyandiamide, 1-alkyl dicyandiamides, and 1-aryl dicyandiamides with a substituted cyanamide carrying a substituent of the group consisting of aliphatic hydrocarbon, aryl hydrocarbon and morpholino radicals in the presence of a basic catalyst, the reaction being conducted in the presence of a water-miscible hydroxylated solvent, and separating from the reaction mixture the corresponding substituted melamine.

2. The process according to claim 1 in which the solvent is an organic solvent.

3. The method according to claim 2 in which the temperature range is substantially 70° to 170° C.

4. The process according to claim 3 which comprises reacting dibenzyl cyanamide and dicyandiamide to produce dibenzyl melamine.

5. The process which comprises heating one mole of dicyandiamide and one mole of 1-cyanomorpholine in the presence of an alkaline agent selected from the group consisting of alkali metal oxides, hydroxides and alkoxides and separating from the reaction mixture 2-morpholino-4,6 diamino-1,3,5,-triazine.

6. A process of preparing N-diallyl melamine comprising reacting substantially equimolar quantities of diallylcyanamide and dicyandiamide in a water-miscible hydroxylated organic solvent in the presence of $\frac{1}{10}$ mole of sodium hydroxide per mole of the diallylcyanamide at a temperature within the range of substantially 100°–150° C. for a period of time not substantially in excess of one hour.

DONALD W. KAISER.

REFERENCES CITED

The following references are of record in the file of this patent:

UNITED STATES PATENTS

| Number | Name | Date |
|---|---|---|
| 2,206,005 | Grim | June 25, 1940 |
| 2,222,350 | Keller | Nov. 19, 1940 |
| 2,265,824 | Thurston | Dec. 9, 1941 |
| 2,328,961 | D'Alelio | Sept. 7, 1943 |
| 2,392,608 | Nagg | Jan. 8, 1946 |

FOREIGN PATENTS

| Number | Country | Date |
|---|---|---|
| 466,957 | Great Britain | June 9, 1937 |
| 235,569 | Switzerland | 1945 |

OTHER REFERENCES

Davis: Journal American Chemical Society, vol. 44, p. 2599 (1922).